US006959818B2

(12) United States Patent
Olson (10) Patent No.: US 6,959,818 B2
(45) Date of Patent: Nov. 1, 2005

(54) FILTER AND FILTER CLEANING APPARATUS AND RELATED METHODS

(76) Inventor: Donald O. Olson, 1953 Haeienda Dr., El Cajon, CA (US) 92020

( * ) Notice: Subject to any disclaimer, the term of this patent is extended or adjusted under 35 U.S.C. 154(b) by 0 days.

(21) Appl. No.: 10/494,237

(22) PCT Filed: Nov. 4, 2002

(86) PCT No.: PCT/US02/35349

§ 371 (c)(1),
(2), (4) Date: May 3, 2004

(87) PCT Pub. No.: WO03/039711

PCT Pub. Date: May 15, 2003

(65) Prior Publication Data

US 2004/0238435 A1 Dec. 2, 2004

Related U.S. Application Data

(60) Provisional application No. 60/338,513, filed on Nov. 2, 2001.

(51) Int. Cl.[7] .................................. B01D 29/68
(52) U.S. Cl. ............... 210/411; 210/413; 210/355; 210/107; 210/108
(58) Field of Search ................ 210/411, 413, 210/355, 107, 108

(56) References Cited

U.S. PATENT DOCUMENTS

| | | | | | |
|---|---|---|---|---|---|
| 3,568,414 | A | * | 3/1971 | Spriggs | 55/294 |
| 4,060,483 | A | * | 11/1977 | Barzuza | 210/741 |
| 4,692,247 | A | * | 9/1987 | Orlans | 210/314 |

* cited by examiner

*Primary Examiner*—Thomas M. Lithgow
(74) *Attorney, Agent, or Firm*—J. Mark Holland & Associates (57) ABSTRACT

Apparatus and methods include an improved filter (203) and cleaning process.

32 Claims, 9 Drawing Sheets

FILTER AND FILTER CLEANING APPARATUS AND RELATED METHODS

RELATED APPLICATIONS

Pursuant to 35 U.S.C. §119(e) and any other applicable provisions, this application hereby claims priority based on U.S. patent application Ser. No. 60/338,513, filed on Nov. 2, 2001. The contents of U.S. patent application Ser. No. 60/338,513, and of any other U.S. patent or other reference, if any, cited in this application, are hereby incorporated herein by reference.

This invention relates to filters in general, and more specifically to improved apparatus and methods for automatically cleaning a filter element.

BACKGROUND OF THE INVENTION

Figure 1A:
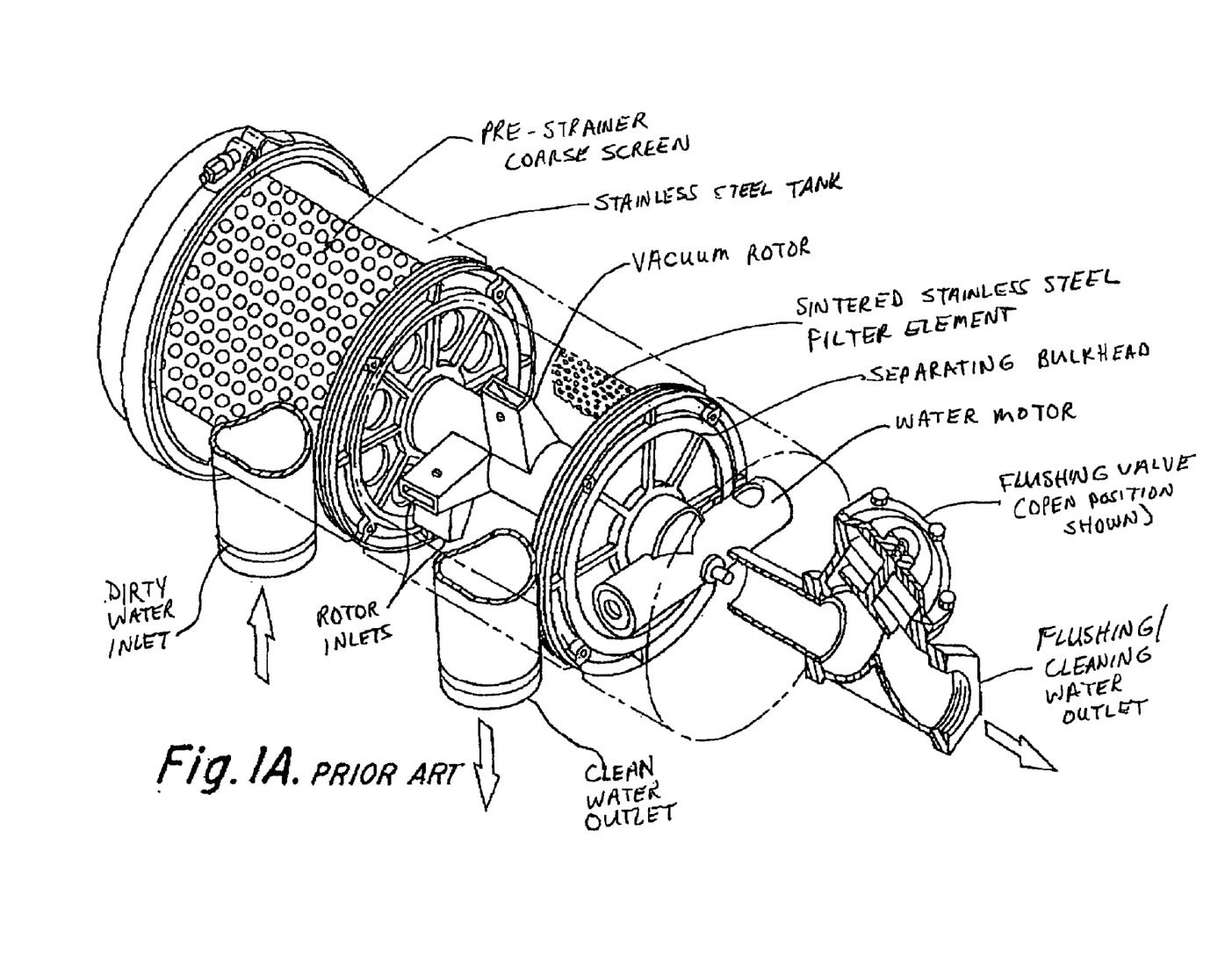
FIG. 1A is a partially cutaway perspective view of a prior art device.
Figure 1B:
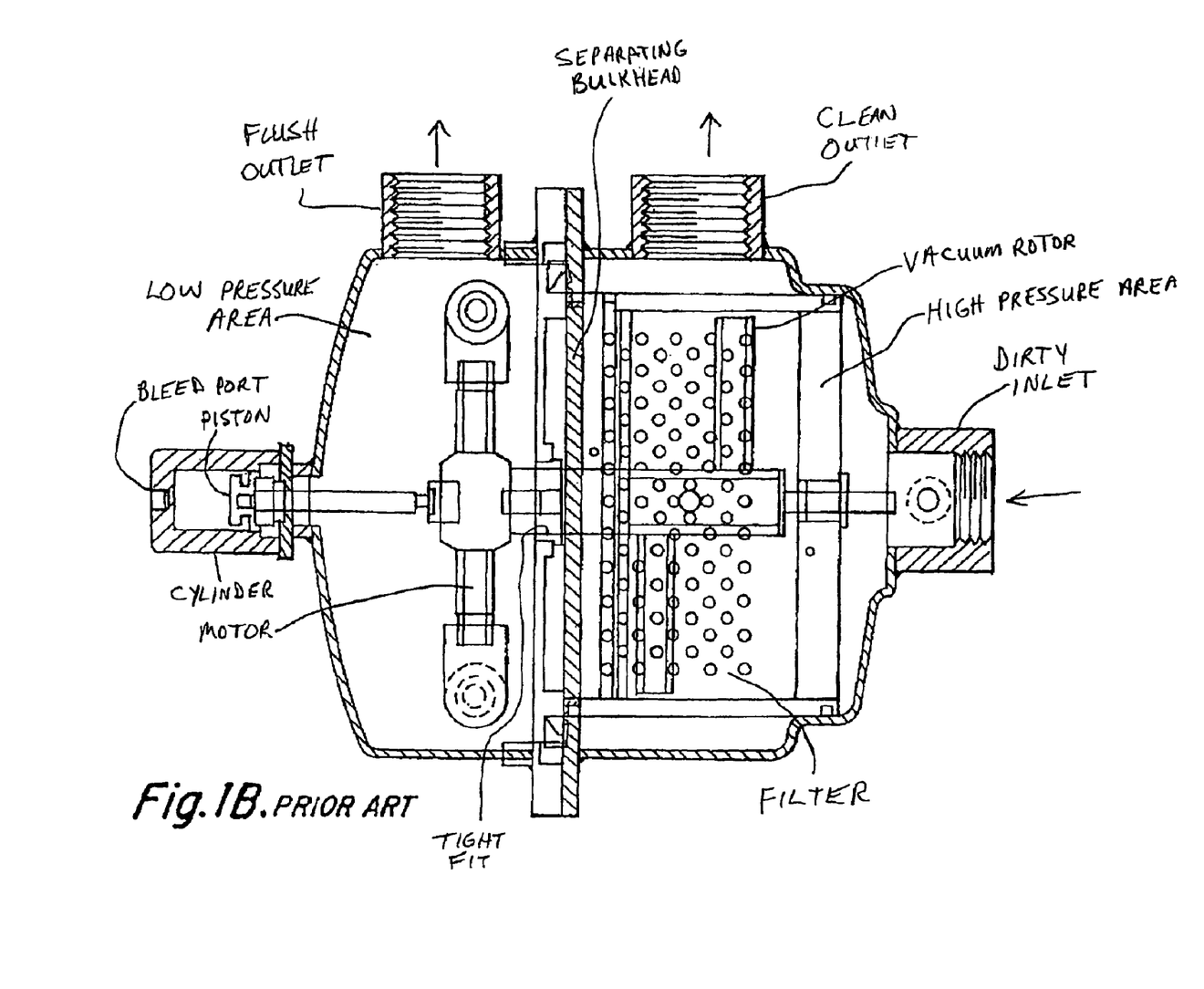
FIG. 1B is a sectional view of another prior art device.

Prior art filters include housings around filter elements, and some include cleaning elements mounted inside the housing to periodically remove debris and contaminants from the filter elements. Examples of prior art systems and methods are illustrated in FIGS. 1A and 1B. Generally, dirty water or other fluid enters the assembly through a "dirty" inlet, passes into the central portion of the filter assembly, and then is filtered by passing radially outwardly through a cylindrical filter element. During use, the high pressure filtering area is "separated" from a lower pressure flushing portion of the assembly by a divider or separating bulkhead.

In these devices, when the filter becomes clogged or too dirty, a valve on the flush outlet is opened to "clean" or "vacuum" the filter. The valve can be actuated, for example, when the system reaches a predetermined pressure differential between the dirty inlet and the clean outlet. The differential typically is monitored by sensors, and that differential typically increases as filtered materials collect on the inside of the filter element.

In systems such as illustrated in FIGS. 1A and 1B, the vacuum cleaning is provided by relatively low pressure at the flush outlet (when the flush valve is opened). That low pressure communicates through a motor assembly connected to vacuum rotors. The rotor inlets are positioned close to the filter element. The relatively lower pressure at the flush outlet creates a vacuum that sucks the debris or buildup formed on the inside of the filter back through the vacuum rotors, back out the motor assembly, and finally through the flushing/cleaning outlet. The aforementioned fluid flow generates a thrust on the motor assembly outlets that rotates the motor and the entire assembly connected to it. The rotating assembly includes the vacuum rotors, which (by rotating) pass over and "vacuum clean" at least some portion of the interior surface of the filter element.

Prior art systems have several shortcomings. Among other things, although systems such as illustrated in FIG. 1A have vacuum rotors sized and positioned to cover substantially all of the filter surface within a single 360 degree rotation, those rotors require large valves and correspondingly large fluid flow to provide sufficient vacuum suction to clean the filter satisfactorily.

Systems such as FIG. 1B typically use smaller valves, but do not provide a "controlled" cleaning cycle that reliably cleans the entire surface of the filter. Instead, the vacuum rotors and motor assembly of FIG. 1B not only rotate during cleaning but also traverses axially from a right-most position (such as shown in FIG. 1B) to the left (not shown). A tight fit 25 is provided between the separating bulkhead and the motor assembly, that permits the motor to rotate within the bulkhead but also permits a "bleed" of pressure past the tight fit 25. When the flush outlet is opened, the high-pressure area adjacent the filter can gradually bleed through the tight fit into the low-pressure area, eventually equalizing those two pressures. Until the pressures equalizes, however, the higher pressure tends to force the motor/rotor assembly to the left.

That movement to the left is impeded to some degree by relatively incompressible fluid in a cylinder 20. To permit some movement to the left, the opening of the flush outlet is coordinated with opening a tiny bleed port 28 at the end of a cylinder 20. That opened bleed port 28 permits a piston 22 in the cylinder 20 (which piston is connected to the motor/rotor assembly) to move toward the left as water is forced out the bleed port 28.

Once the pressure has equalized, the flush outlet and bleed port 28 are closed, and the larger effective surface area on the left side of the motor/rotor assembly forces the assembly to move back to the right. During that portion of the cycle, there is no vacuum action at the rotor inlets, so the filter is not being cleaned. Said another way, the only "cleaning" that occurs is during the single pass from right to left. Depending on the pressure differential, the condition of the various seals and fitting areas, and other factors, that single pass movement from right to left can occur so quickly that it is uncertain that the rotor inlets will pass over all of the filter's interior surface. Those areas that are missed remain dirty, decreasing efficiency and performance of the filter, and requiring more frequent (albeit less efficient) cleaning cycles.

OBJECTS AND ADVANTAGES OF THE INVENTION

It is, therefore, an object of the invention to provide improved apparatus and methods for cleaning a filter element. In the preferred embodiment, relatively smaller valves and fluid flows can be used to vacuum the inside of the filter surface in a very controlled manner, to ensure that all of the surface gets cleaned. As with prior art devices, the apparatus and methods can be automated, via sensors and the like.

Other objects and advantages of the invention will be apparent from the following specification and the accompanying drawings, which are for the purpose of illustration only.

DESCRIPTION OF PREFERRED EMBODIMENT

Figure 2:
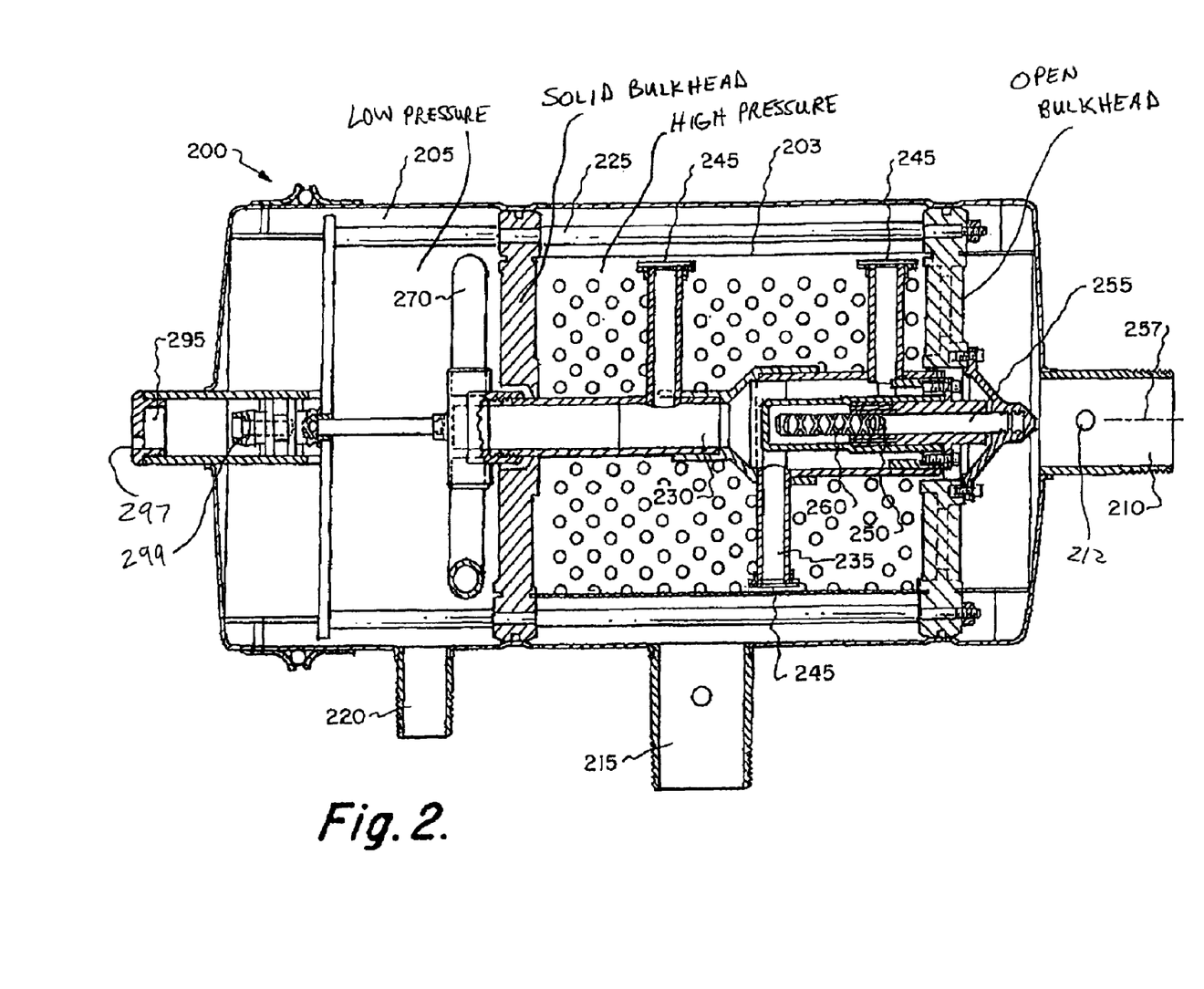
FIG. 2 is a sectional view of a preferred embodiment of the invention.
Figure 3:
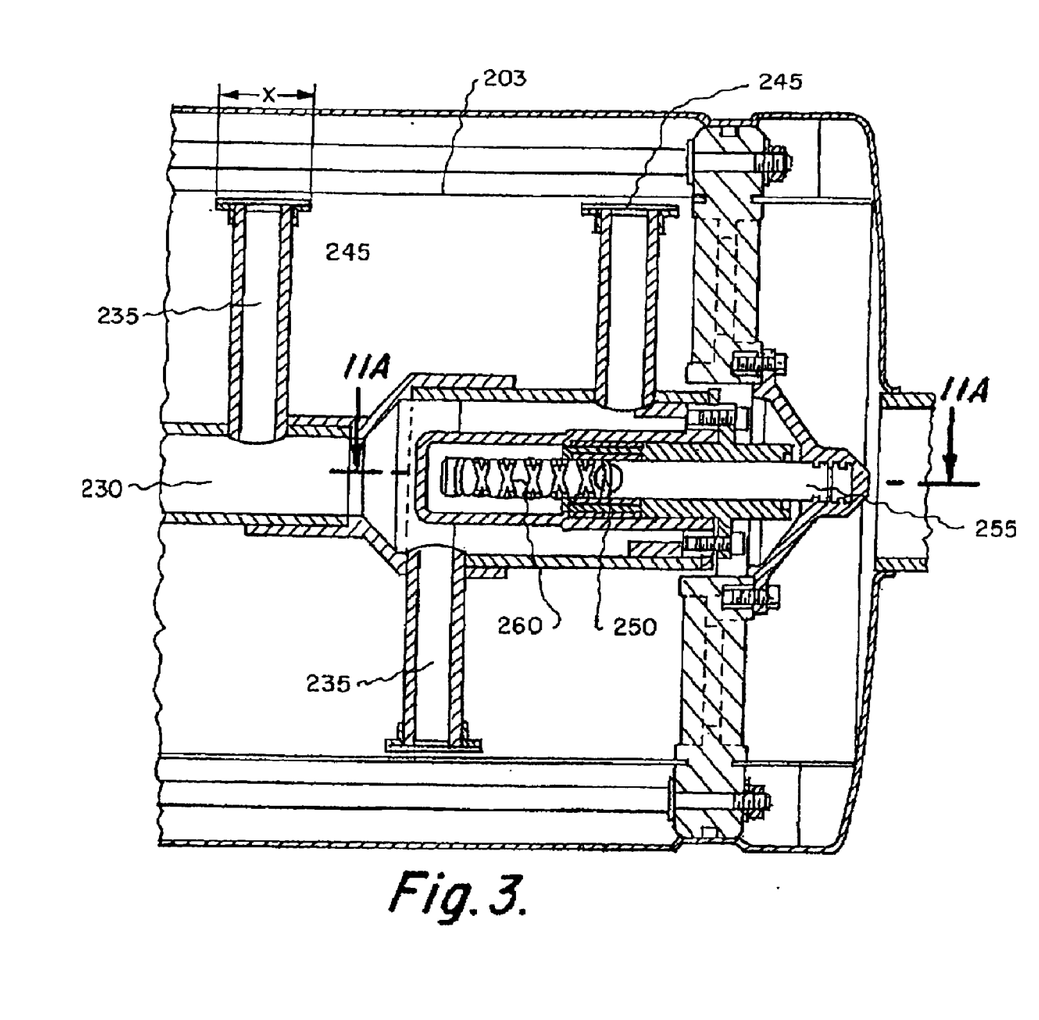
FIG. 3 is an enlarged view of a portion of the right end of FIG. 2.
Figure 4:
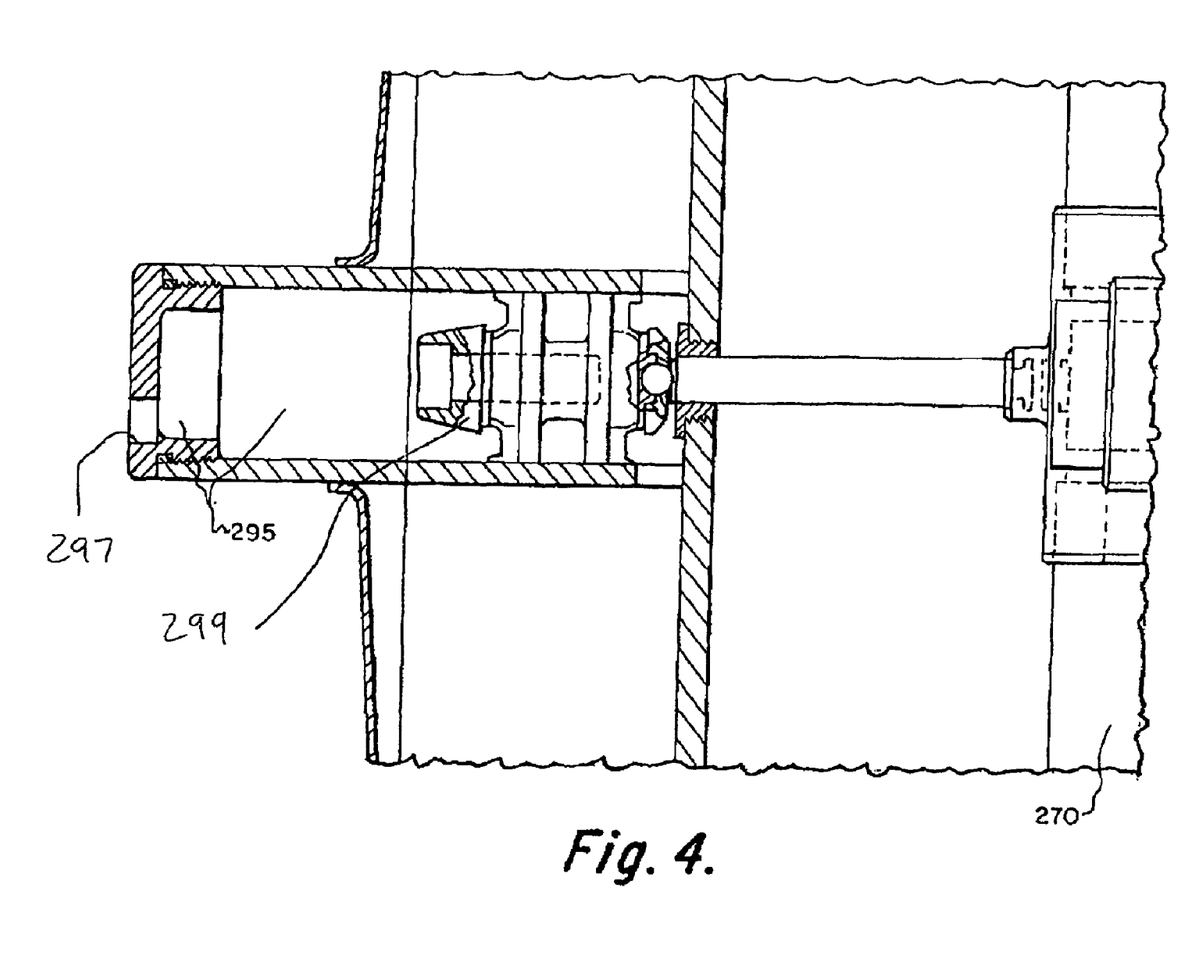
FIG. 4 is an enlarged view of a portion of the left end of FIG. 2.

A preferred embodiment of the invention is illustrated in FIGS. 2–4, and includes apparatus 200. Although it utilizes certain generally known concepts including some of those in the prior art of FIGS. 1A and 1B, as described herein, the preferred embodiment provides much more precise control than prior art devices of which the inventor is aware, and better ensures that most or all of the interior surface of the filter element gets cleaned during each cleaning cycle.

Preferably, the components of the invention are fabricated from suitably strong materials to withstand the various pressures and cyclical repetitions of movements described herein. In addition, persons of ordinary skill in the art will understand that the materials preferably should be resistant to corrosion and other deterioration that may be associated with the various liquids and debris being filtered.

As best shown in FIGS. 2 and 3, the preferred embodiment of the filter cleaning apparatus 200 comprises a housing 205 having an inlet 210, a clean outlet 215, and a flushing outlet 220. The preferred apparatus further includes a filter element 225 positioned to filter fluid flowing from the housing inlet 210 to the clean outlet 215. A cleaning element 230 having one or more vacuum rotors 235 is further included. Preferably, the vacuum rotor or rotors 235 rotate about a central axis 257 of the cleaning element 230. The vacuum rotor 235 preferably includes a rotor inlet 245 positioned to collect debris from the filter element 225 and guide debris from the filter element 225 for eventual dispensing out of the flushing outlet 220.

The cleaning element 230 also preferably includes a water-driven rotor motor 270 to facilitate rotational movement of the cleaning assembly or element 230, in response to the vacuum action through that assembly as debris is vacuumed from the filter. As explained below, this rotation preferably is translated into bi-directional linear movement of the assembly 230 along the lengthwise axis 257. During filter cleaning, fluid moving through the rotor motor 270 generates a thrust on the motor outlets that rotates the rotor motor 270 and thereby the entire assembly 230 connected to it. Thus, the cleaning element 230 may also be referred to as a rotor/motor assembly.

Among the many alternative embodiments of the invention, the vacuum rotor 235 may be rotated by motor power other than the vacuum thrust of the water as it exits during the cleaning cycle of the apparatus. For example, electrical or manual power (not shown) may provide the force necessary to rotate the cleaning element 230.

The cleaning element 230 preferably is configured and positioned to be actuated by opening the flushing outlet 220. Opening and closing the flushing outlet 220 preferably is controlled by conventional pressure sensing apparatus, in response to pressure differentials between the filter section and the flushing section of the apparatus 200. Opening that flushing outlet 220 preferably creates a vacuum flowing from the inlets 245 of vacuum rotors 235 through motor 270, toward outlet 220. That vacuum preferably results in a fluid flow along that same path, which in turn preferably causes the desired rotation of the rotor inlet or inlets 245. As explained herein, that preferred rotation of cleaning element 230 (about the axis 257) and the preferred longitudinal displacement of cleaning element 230 (along the lengthwise axis 257) results in the inlet or inlets 245 passing over (and thereby "vacuuming ") substantially the entire interior surface of filter element 225. This vacuuming preferably removes accumulated debris from the filter surface 203.

Persons of ordinary skill in the art will understand that the relative number and relative dimensions of the inlets 245 can vary according to the particular application. Among other things, the relative size of the interior surface of filter element 225 and the specific dimensions and design of the preferred bi-directional track and pawl assembly (discussed below) can impact the necessary and/or desired size and spacing of the openings or inlets 245 along the cleaning element 230. Although three such inlets 245 are illustrated in FIGS. 2–4 and two are shown in FIGS. 5–10, persons of ordinary skill in the art will understand that as few as one, and many more than three, could be used for certain applications.

To provide higher vacuum force, the inlet or inlets 245 preferably are less (individually and collectively) than the full width of the filter element 203. Accordingly, to ensure that the entire interior of the filter element 203 is vacuumed during the cleaning cycle of the apparatus, the apparatus 200 preferably includes a linkage to move the assembly 230 along the lengthwise axis 257 during the vacuum/rotation cycle. In the preferred embodiment, this linkage includes a tracking guide or pawl 250 that cooperatively engages a helical or bi-directional thread 260.

In the preferred embodiment, the thread 260 is located on a central screw 255 and the pawl 250 is rotatably positioned in a wall of the cleaning element 230. However, persons of ordinary skill in the art will understand that the thread and pawl could instead be reversed (with the pawl 250 located in the central screw or core element 255 and the thread 260 located on the cleaning element (rotor/motor assembly) 230). In any case, the assembly preferably ensures complete (or substantially complete) cleaning of the filter element 225 by the rotor inlet or inlets 245, by the combination of rotational and linear movements of the assembly 230 about and along the screw 255, as described herein.

Persons of ordinary skill in the art will understand that, during the cleaning cycle, those movements preferably expose all (or virtually all) of the interior surface of the filter element to the vacuum provided via the inlet or inlets 245. In the preferred embodiment, if there is sufficient pressure differential to rotate the assembly 230 enough times, a cleaning cycle can even expose some or all of the interior filter surface to the vacuum at inlet 245 more than once (as the assembly 230 cycles back and forth along the bi-directional thread 260).

Figure 11A:
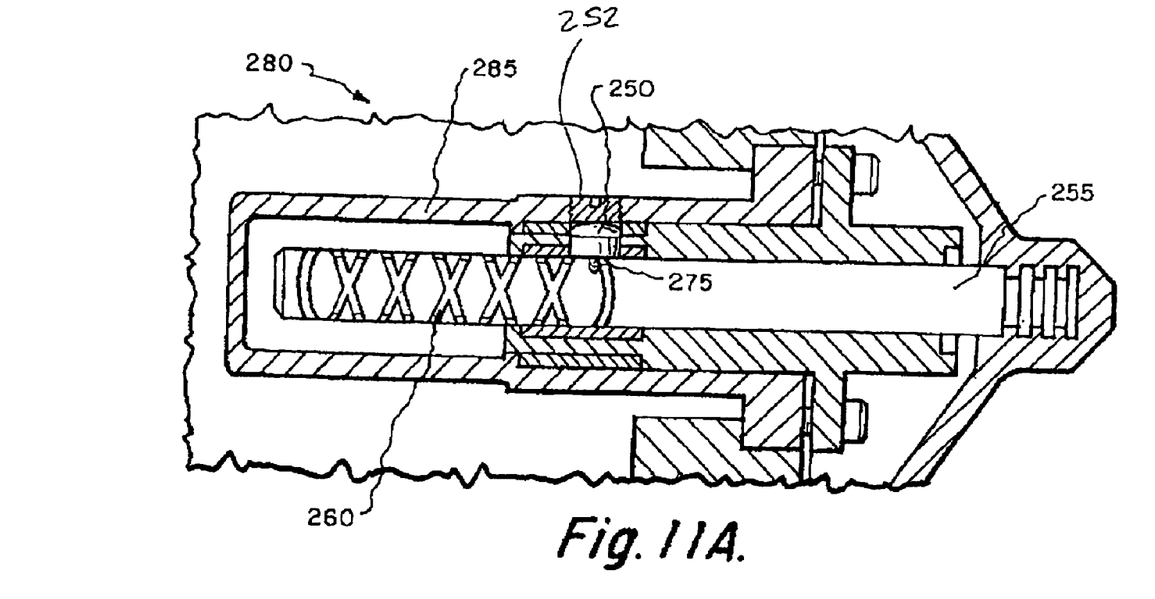
FIG. 11A is a sectional view taken along line 11A—11A in FIG. 3.
Figure 11B:
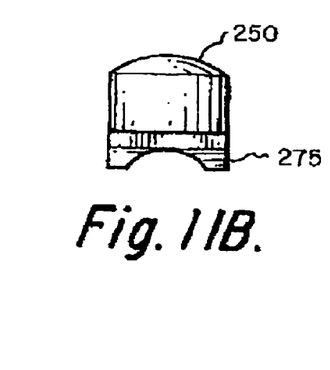
FIG. 11B is similar to FIG. 11C, and is a side elevation view of a preferred pawl 250 turned 90 degrees from the orientation shown in FIG. 11A.
Figure 11C:
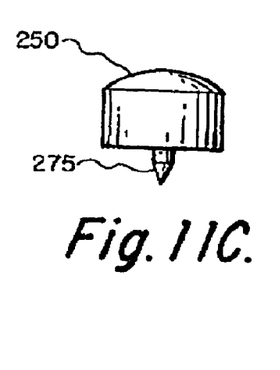
FIG. 11C is similar to FIG. 11B, and is a side elevation view of a preferred pawl 250 in the same orientation as shown in FIG. 11A.

As best illustrated in FIGS. 11A–C, the tracking guide or pawl 250 preferably is rotatably positioned in a transverse cylindrical opening formed in the cleaning element 230. This preferably permits the pawl 250 to rotate around an axis transverse to the central axis 257 as the track or thread 260 passes beneath it (or it passes over the thread) during the cleaning cycle. That rotation preferably is caused by interaction between the pawl 250 and helical track 260. When assembled, a tooth 275 of the pawl 250 preferably extends toward and engages and slides through the trough or thread 260 on the central screw or core element 255. During the rotation of the cleaning element 230 as part of the cleaning cycle, the orientation of the tooth 275 follows the thread 260, including during any reversals of the thread direction such as preferably occur with the bi-directional embodiment of thread 260.

In the preferred embodiment, the cleaning element 230 and the pawl 250 mounted therein are capable of rotational movement about the central screw 255, and the central screw 255 is fixed relative to the housing 205. In some of the many alternative embodiments of the invention (such as illustrated in FIG. 5), the apparatus 200 may have a central screw 255 that rotates with the cleaning element 230, while the engaging pawl 250 is "fixed" relative to the housing 205.

Further regarding the embodiment of FIGS. 5–10, many of the general principles of that embodiment are the same as discussed herein for the embodiment of FIGS. 2–4. Dirty liquid comes into the apparatus through inlet 302, filtered or clean liquid exits the apparatus via clean outlet 304 after passing through an open bulkhead 306 and a filter 308. A solid bulkhead 310 includes a tight fit 312 against the rotating cleaning element assembly 314. Valve means (not shown) can be opened on a vacuum/cleaning outlet 316 to actuate the flushing of debris out that outlet 316 from the interior surface of the filter 308.

Figures 5, 6:
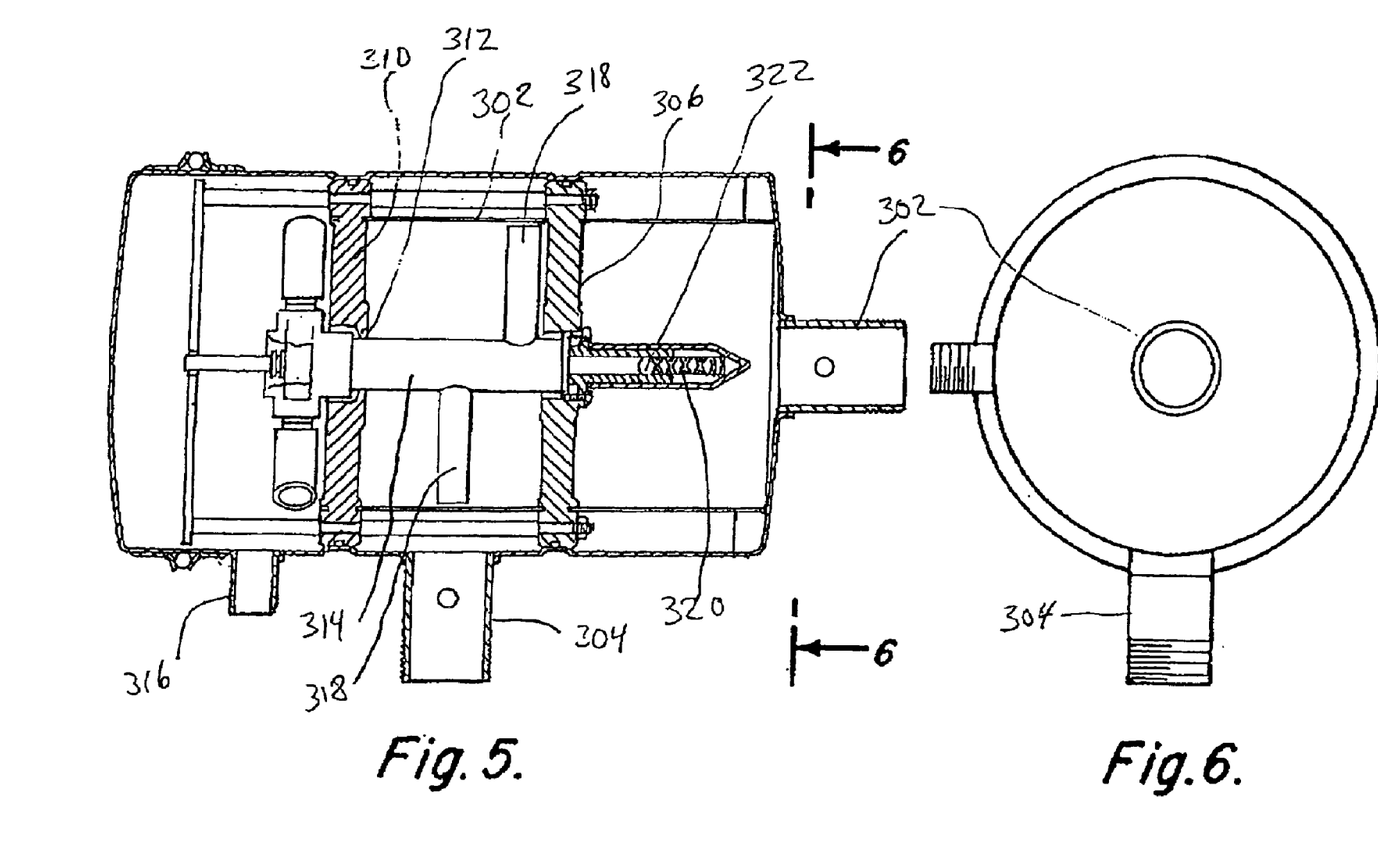
FIG. 5 is a partially cutaway sectional view of one of the many alternative embodiments of the invention.
FIG. 6 is an end view of the device of FIG. 5, taken along line 6—6 in FIG. 5.

Among the differences between the embodiment of FIGS. 2–4 and that of FIGS. 5–10 is the number of vacuum rotors/inlets 318 (only two rotors in the embodiment of FIG. 5, rather than the three of FIG. 2) and the location and connection of the threaded core element 320 and pawl 322 (both are to the right of the open bulkhead 306 in the embodiment of FIG. 5, but are to the left of the open bulkhead in the embodiment of FIG. 2).

The tracking guide or pawl 250 preferably is held in place in a manner permitting its rotation, as described above. In the preferred embodiment, this is accomplished by a securing member such as a screw 252 (FIG. 11A) formed of brass or other similarly suitable bearing material (to permit the rotation of the pawl). Persons of ordinary skill in the art will understand that the retention of pawl 250 can be accomplished in a wide variety of ways. By way of example, for alternative embodiments (not shown) in which the pawl is mounted on the central screw and has a tooth that extends outwardly to engage a surrounding thread pattern, a transverse hole can be provided into the central screw, a spring member inserted into the hole, and the pawl then inserted atop the spring. In such an embodiment, the spring is initially compressed to permit assembly of the pawl within the thread, and thereafter urges the pawl outwardly into desired engagement with the thread. As indicated above, the spring and/or a contact portion thereon preferably (and similarly to screw 252) is fabricated of brass or similar material so that it can provide a bearing surface for allowing the desired rotation of the pawl 250 when it is seated on the spring.

Thus, during the cleaning cycle, the tracking guide element 250 (and the rotating vacuum rotor/motor assembly 230 in which it is mounted) preferably cycles at least one time along the entire length of a preferred bi-directional thread 260. The preferred bi-directional embodiment of thread 260 permits the vacuum cleaning to occur on a continuous loop/path (given sufficient pressure differential to rotate the assembly enough times), thereby moving the inlets 245 around and back and forth along the axis 257. In contrast, prior art devices of which the inventor is aware only mace at most a single pass along the length of the axis, and any "remaining" drive energy simply rotates the vacuum inlets at a fixed position along the length of that axis (typically at the position of lengthwise axial movement that is farthest away from its starting/resting position during times other than the cleaning cycle). In other words, prior art systems do not force the vacuum inlets back across the interior surface of the filter. The present invention does so, thereby permitting the opportunity for further/better cleaning of the filter during any given cleaning cycle.

In the preferred embodiment, the pitch and axial length of the bi-directional thread 260 of the central screw 255 or the cleaning element 230 is preferably selected or adapted based on the relative size and numbers of the rotor inlets 245. Persons of ordinary skill in the art will understand that proper selection of that pitch can ensure, for example, that a single 360 degree rotation of the vacuum rotor 235 will move the vacuum rotor/motor assembly 230 axially (along the length of axis 257) no more than the width of the rotor inlet 245. In the preferred embodiment, each rotation of the rotor/motor assembly 230 finds a given rotor inlet 245 positioned immediately beside (or overlapping) the path it cleaned on the previous rotation.

Persons of ordinary skill in the art will understand that, among the many alternative embodiments of the invention (not shown), the thread pitch could be different. By way of example and not by way of limitation (and not shown in the figures), where a plurality of inlet arms 235 are provided at the same axial lengthwise position along the assembly 230, the thread pitch could be such that a 360 degree rotation moved the assembly more than one inlet's width along the length of axis 257. For example, if two such arms are aligned with each other on the assembly 230, the entire interior of the filter could be vacuumed by a thread pitch that moved the assembly one inlet's width in only 180 degrees of tuning (three such aligned arms—again, not shown in the current drawings—would permit a thread pitch requiring only 120 degrees of rotation for each axial lengthwise distance of movement, and so on).

In addition, when the rotor/motor assembly 230 has completed its motion from right to left (as shown in the drawings), the preferred linkage between bi-directional thread path 260 and pawl 250 ensures that the rotor/motor assembly 230 then reverses itself and moves back to the right, vacuuming back over the filter's surface 203 again. Opening the flush outlet/valve 220 for a sufficient period of time ensures that no area of the filter surface 203 is left uncleaned, and can even ensure that multiple cleaning passes are made in each direction (right and left) during each cleaning cycle.

If the relative flow rates of dirty water/liquid in (via inlet 210), filtered water out (via outlet 215), and vacuumed debris out (via outlet 220) are properly controlled with respect to each other (via valves or other conventional or suitable mechanisms), the system can be operated so that it continues filtering (and dispensing filtered liquid out the outlet 215) during the entire cleaning cycle. Similarly, by closing the clean outlet 215 and leaving open the inlet 210 during the cleaning cycle (or by providing sufficient excess fluid flow into the inlet 210 as compared to the outflow through clean outlet 215, via valves or otherwise), the pressure or extra flow of the incoming fluid can be used to "drive" the cleaning assembly 230 for as long as desired for a given application.

Thus, in the preferred embodiment, a bi-directional control apparatus 280 ensures complete or improved cleaning of the filter element 225 by the rotor inlet or inlets 245, as shown in FIG. 11A. The bi-directional control apparatus 280 preferably includes a core element or central screw 255 and a sleeve element 285. The core element 255 and sleeve element 285 preferably are concentrically aligned and rotatable with respect to each other. As shown in FIG. 11B and FIG. 11C, the control apparatus 280 preferably further includes a tracking guide 250 having an engaging member 275 for controlling bi-directional axial movement. The tracking guide 250 is positioned to act between the core element 255 and the sleeve element 285. The engaging member 275 preferably cooperates with the core element 255 and the sleeve element 285 during rotation of either the core element 255 or the sleeve element 285. Persons of ordinary skill in the art will understand that a concave surface preferably is provided in the tooth or engaging member 275 (as best shown in FIG. 11B) to ensure a deeper and more secure "seating" of the tooth 275 within the thread path 260. The many alternative embodiments of the invention would include those having flat or other non-concave shapes for the tooth 275.

Persons of ordinary skill in the art will understand that, among the many advantages of the preferred embodiment of the invention, the cleaning cycle can start with the cleaning assembly 230 positioned at any point along the lengthwise axis 257. Thus, unlike prior art systems of which the inventor is aware, the preferred embodiment of this invention does not have to be "pushed" back axially to a starting position as part of each cleaning cycle.

The preferred operation of the bi-directional control apparatus 280 will now be discussed in more detail. Persons of ordinary skill in the art will understand that many alternative methods and processes can utilize various aspects of the invention in various embodiments, in addition to those mentioned here.

In the preferred embodiment, the sleeve element 285 can move relative to the core element 255. By virtue of the preferred linkage between those elements 285 and 255, the preferred movement between them generally is both rotational (around axis 257) and linear (along axis 257). Preferably, as part of that linkage, the core element 255 includes a bi-directional or continuous substantially helical thread 260. However, persons of ordinary skill in the art will understand that the same general operating principles described herein can be used in alternative embodiments, including (by way of example) embodiments in which a bi-directional thread 260 is provided on the inside of a sleeve element 285.

Figure 7:
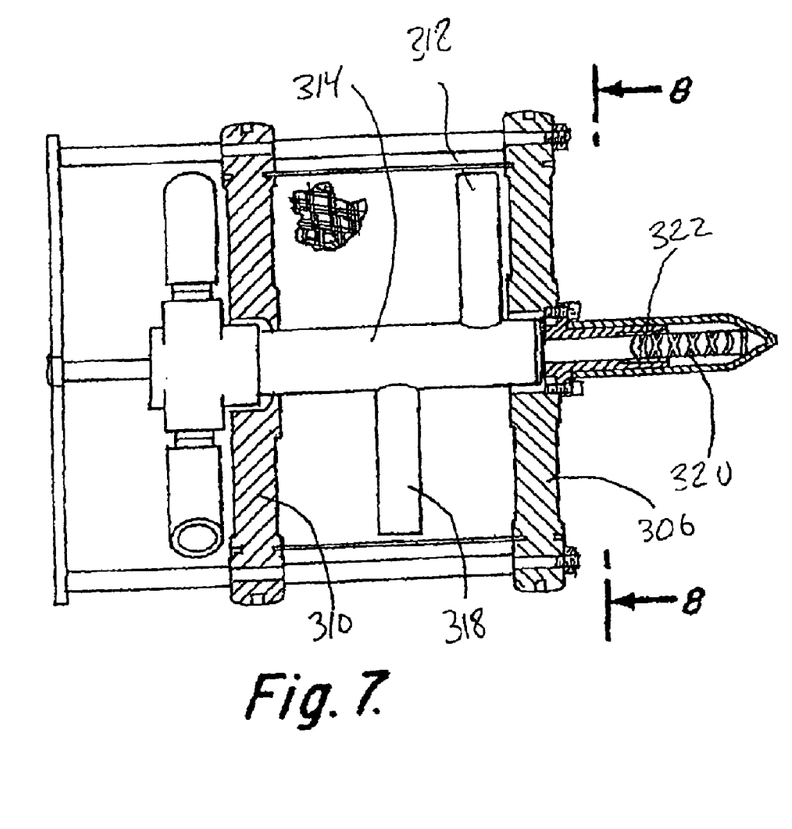
FIG. 7 illustrates some of the internal detail of the assembly of FIG. 5.
Figure 8:
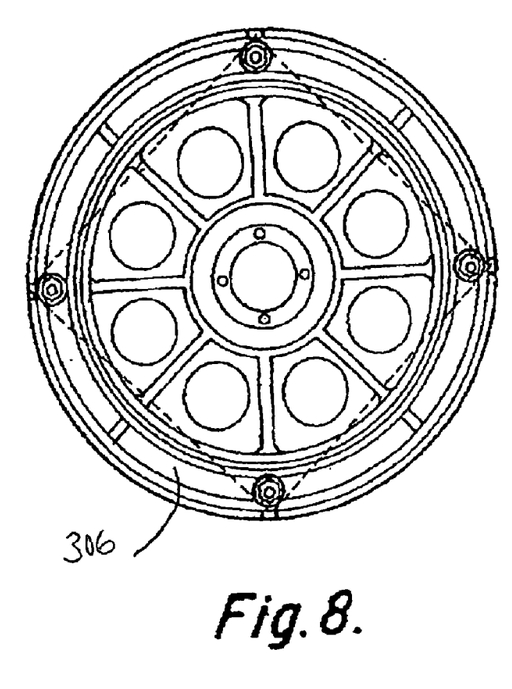
FIG. 8 is an end view taken along line 8—8 in FIG. 7.
Figure 9:
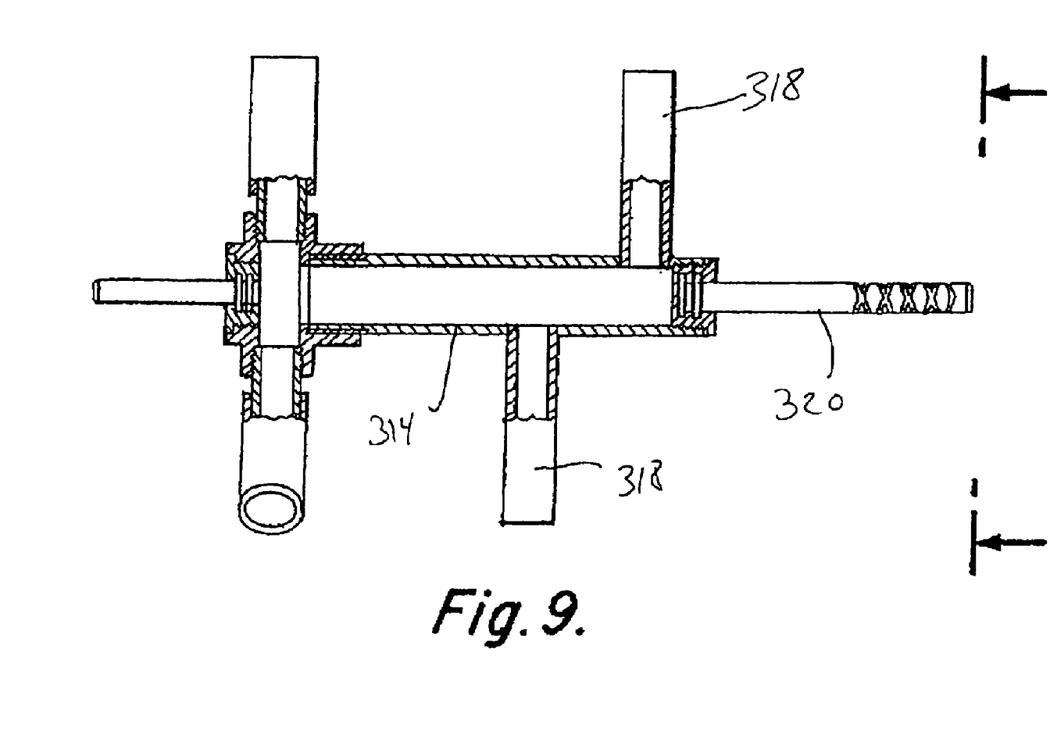
FIG. 9 illustrates further internal detail of the assembly of FIGS. 5 and 7.
Figure 10:
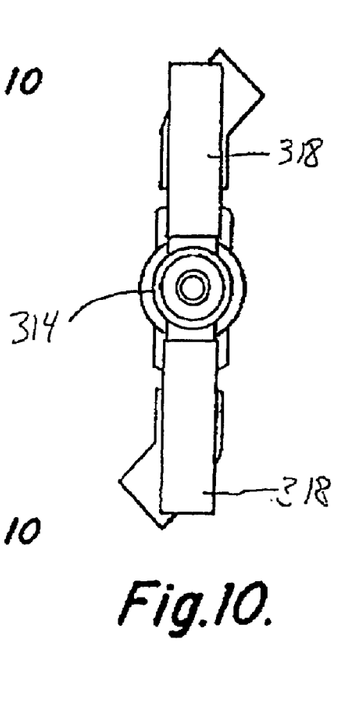
FIG. 10 is an end view taken along line 10—10 in FIG. 9.

Persons of ordinary skill in the art will understand that the linkage to provide the desired rotational and longitudinal movement can take a variety of embodiments. By way of example, and as shown in FIG. 5 and FIG. 7, the sleeve element 285 is fixed relative to the core element 255 and the pawl element (not shown) is fixed to the housing 205. Accordingly, instead of the pawl (seated in the assembly 230) rotating about the core 255 (as occurs in the embodiment of FIGS. 2 and 3), the core element 255 rotates with the assembly 230 in a linked relationship with a "fixed" pawl. Persons of ordinary skill in the art will understand that, as with many other alternative embodiments of the invention, the resulting rotation/translational movement can be the same in either case.

As shown in FIG. 11A, during cleaning of the filter, fluid exiting the rotor motor 270 (because of the vacuum force due to the pressure differential between the inside of the filter element and the dirty outlet 220 when it is opened for cleaning) preferably generates a thrust on the motor outlets. That thrust preferably rotates the rotor motor 270 and thereby the entire assembly 230 connected to it. In this embodiment (see FIG. 11A), the sleeve element 285 preferably is connected to the cleaning element 230, so that rotation of the rotor motor 270 rotates the cleaning element 230 and the sleeve element 285.

In the embodiment of FIGS. 2, 3 and 11A, a tracking guide 250, such as a pawl, is held within the sleeve element 285 by a securing member such as a screw, spring, bearing or similarly adapted device or combination of elements. The tracking guide 250 therefore rotates with the sleeve element 285. Preferably, the pawl 250 also can rotate around a vertical axis through the pawl's center in the plane of FIG. 11A, to permit it to thereby align with the changes in orientation of the confronting portion of the groove or thread 260 in which it is engaged. As persons of ordinary skill in the art will understand, that orientation preferably changes (in fact "reverses") at each end of the helical thread pattern 260, so that the linear translational movement of the assembly 230 likewise reverses (and returns in the opposite linear/axial direction) upon reaching each end of the groove 260. Persons of ordinary skill in the art will understand that, so long as sufficient differential pressure exists to rotate the assembly 230, the assembly 230 will contemporaneously traverse back and forth along the length of the thread helix 260.

Said another way, as the assembly 230 and the tracking guide 250 mounted therein rotates around the core 255, the engaging member 275 tracks along the bi-directional thread 260 of the core element 255. Upon reaching the bi-directional thread 260 limit in one direction, the tracking guide 250 pivots (about the vertical axis through the pawl's center in the plane of FIG. 11A, described above) to continue tracking along the bi-directional thread 260, causing further linear displacement of the assembly 230 relative to the core 255, but now in the opposite direction. In this manner, the tracking guide 250 preferably cycles back and forth through a bi-directional thread 260 of the core element or central screw 255. The bi-directional thread path 260 permits the rotor/motor assembly 230 to reverse itself (axially, not radially) and move axially in the opposite direction, vacuuming back over the filter's surface 203 again (and again and again, as long as desired/powered). As mentioned herein, opening of the flush valve 220 for a sufficient period of time thus ensures that no area of the filter surface 203 is left uncleaned, and can even ensure that multiple passes are made in each direction during each cleaning cycle.

In the preferred embodiment, and as best illustrated in FIG. 3, the pitch of the bi-directional thread 260 is preferably configured, among other things, to ensure that a single 360 degree rotation of the vacuum rotor 235 will move the vacuum rotor/motor assembly 230 (and each inlet 245 thereon) axially lengthwise no more than the width "x" (FIG. 3) of the rotor inlet 245. For example, as shown in FIG. 3, if the effective opening of a rotor inlet 245 is a length "x", then a single 360 degree rotation of the vacuum rotor 235 preferably will move the vacuum rotor/motor 230 a distance substantially equal to or less than "x". Limiting axial movement of the rotor/motor assembly 230 to a distance substantially equal to or less than "x" ensures complete coverage of the filter surface 203 by the rotor inlet 245 during the cleaning cycle. Thus, each rotation of the preferred rotor/motor assembly 230 finds a given rotor inlet 245 positioned immediately beside (or overlapping) the path it cleaned on the previous rotation.

Thus, the preferred filter cleaning apparatus of the invention includes a housing having an inlet, a clean outlet, and a flushing outlet; a filter element positioned to filter fluid flowing from the housing inlet to the clean outlet; and a cleaning element having a vacuum rotor. The vacuum rotor further preferably includes one or more rotor inlets positioned to collect debris from the filter element and guide the debris for eventual dispense out the flushing outlet. The cleaning element is configured and positioned to be actuated by opening the flushing outlet, and the vacuum rotor passes over substantially the entire filter element to vacuum debris therefrom. A tracking guide or pawl preferably is positioned between the cleaning element and a central screw, and helps provide the controlled movement of the vacuum rotor inlets over the filter surface during the cleaning cycle.

The present invention includes various methods of filtering fluid and selectively cleaning the filter. In the preferred embodiments, this cleaning is accomplished for many cycles without having to disassemble the apparatus. Initial assembly of the various components of the apparatus can be accomplished by any suitable means. Preferably, the assembly includes the steps of attaching the hydraulic motor 270 to the reverser assembly 230, assembling the bulkheads to the carriage frame, and fastening the nuts (four are illustrated in the embodiments of the figures) to hold the assembly together within the housing.

The methods of the invention further preferably include the steps of filtering fluid until a predetermined pressure differential is reached between fluid flowing into the housing inlet and fluid exiting the clean outlet; and flushing debris from the filter element, i.e., pressure difference between the incoming dirty fluid and the outgoing clean fluid. The flushing step may further include the steps of opening the flushing outlet to actuate the cleaning element and closing the flushing outlet after the cleaning element rotor has passed over the entire surface of the filter element. Preferably, an automatic controller monitors the pressure difference between the fluid flowing from the housing inlet and the fluid exiting the clean outlet. When the pressure difference reaches a predetermined level, the automatic controller is activated and opens the flush valve. The preferred method utilizes the apparatus and functionality of the preferred embodiment of FIGS. 2 and 3, although persons of ordinary skill in the art will understand that other apparatus and other steps can be used as well.

Persons of ordinary skill in the art will understand that, although methods and processes of the present invention have been illustrated and/or described herein with steps occurring in certain orders, the specific order of the steps is not necessarily required, because certain steps are not dependent on certain other steps. Exemplary in that regard, the step of flushing debris from the filter element may occur on a periodic basis, e.g., as a preventive maintenance plan, before the filtering step. Furthermore, the steps of filtering and flushing are not meant to be mutually exclusive of each other, but may occur during substantially the same time.

As best shown in FIG. 2, to reduce the internal stress on the components (during the rotation/cleaning cycle or otherwise), a fluid line (not shown) preferably connects ports 212 (communicating with the liquid inlet 210) and port 297. Persons of ordinary skill in the art will understand that, among other things, this line equalizes or generally balances the net pressure that otherwise would act on the inlet 210 side of the apparatus to force the rotor/motor assembly 230 to the left (as viewed in FIG. 2). Preferably, the pressure on the "high pressure" side of the solid bulkhead in FIG. 2 is transmitted through the port 212 via the line (not shown) to provide that same "high pressure" through port 297 to chamber 295. Persons of ordinary skill in the art will understand that the pressure in chamber 295 can then act on the piston assembly 299 to exert a counteracting force to the right, to offset or equalize the aforementioned pressure to the left. Although this type of balance is not required in order to enjoy certain benefits of the invention, that balance preferably improves performance and reduces wear and stress on the various components. Further in that regard, persons of ordinary skill in the art will understand that the entire portion of the preferred embodiment of FIG. 2 to the right of the solid bulkhead preferably is in fluid communication (including on both sides of the open bulkhead, through that open bulkhead or otherwise), so that the only "low pressure" zone in the system is that to the left of the solid bulkhead (except that the chamber 295 can be connected to high pressure via the port 297, as mentioned above).

As indicated above, the number, size, and position of the various components (such as rotor inlets, motor outlets, dirty inlets, clean outlets, flush outlets, etc.) of the invention can vary, depending on the application and other factors. The invention may be used with a wide variety of fluids and applications, and the materials from which the components are constructed can be any suitably strong, liquid-tolerant substances.

The apparatus and methods of the invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. A filter cleaning apparatus including:
   a housing having an inlet, a clean outlet, and a flushing outlet;
   a filter element positioned to filter fluid flowing from said housing inlet to said clean outlet;
   a cleaning element having a vacuum rotor, wherein said vacuum rotor further includes a rotor inlet positioned to collect debris from said filter element and guide the debris for eventual dispense out said flushing outlet;
   a tracking guide positioned between said cleaning element and a central screw; and
   a pressure line connecting said housing inlet to a port located remotely on said housing, said port located to offset or generally balance pressure that would otherwise be exerted on said cleaning element;
   wherein the cleaning element is configured and positioned to be actuated by opening the flushing outlet; and
   wherein the vacuum rotor passes over substantially the entire filter element to vacuum debris therefrom.

2. The apparatus of claim 1, wherein actuation of said vacuum rotor is facilitated by a rotor motor operatively affixed to said cleaning element.

3. The apparatus of claim 1, wherein said filter element is generally cylindrical, and the combination of said vacuum rotor and said cleaning element rotate about a longitudinal axis through the lengthwise center of said cylinder.

4. The apparatus of claim 3, wherein said rotation is powered by a water motor.

5. The apparatus of claim 3, wherein said rotation is powered by motor other than a water motor.

6. The apparatus of claim 1, wherein said tracking guide engages and travels along a helical thread on said central screw during rotation of said tracking guide about said screw when said flushing outlet is opened.

7. The apparatus of claim 6, wherein said thread is configured so that a single complete rotation of said vacuum rotor moves said cleaning element axially no more than the width of said rotor inlet.

8. The apparatus of claim 6, wherein said tracking element is a rotatable pawl having an engaging member for engaging said helical thread.

9. A method of filtering fluid comprising the steps of:
providing the filter cleaning apparatus of claim 1;
filtering fluid until a predetermined pressure differential is reached between fluid flowing into the housing inlet and out of the clean outlet; and
flushing debris from said filter element.

10. The method of claim 9, in which said steps of filtering and flushing occur concurrently.

11. The method of claim 9, wherein said flushing step further comprises the steps of: opening said flushing outlet to actuate said cleaning element; and closing said flushing outlet after said cleaning element rotor has passed over substantially the entire surface of said filter element.

12. Apparatus to filter fluid and periodically clean a related filter element, including a housing with an inlet, a clean outlet, a filter element positioned to filter fluid flowing from the inlet to the clean outlet, a cleaning element configured and positioned to be actuated by opening the flushing outlet, said cleaning element including at least one vacuum rotor that, upon actuation by opening the flushing outlet, passes over substantially the entire filter element to vacuum debris therefrom, said passing over being ensured by a control member acting between said cleaning element and said housing, and a pressure line connecting said housing inlet to a port located remotely on said housing, said port located to offset or generally balance pressure that would otherwise be exerted on said cleaning element.

13. The apparatus of claim 12, wherein said control member includes a linkage comprising a bi-directional thread engaged by a pawl member, whereby said pawl member slides through said thread path during said actuation of said cleaning element.

14. The apparatus of claim 13, wherein said pitch and length of said bi-directional thread is selected to ensure that said at least one vacuum rotor passes over substantially the entire filter element during said actuation of said cleaning element.

15. A method of filtering fluid, including:
providing the apparatus of claim 12;
filtering fluid until a predetermined pressure differential is reached between the incoming dirty fluid and the outgoing clean fluid; and
opening the flushing outlet to actuate the cleaning element; and closing the flushing outlet after the cleaning element rotor or rotors have passed over the entire surface of the filter element.

16. The method of claim 15, wherein said control member includes a pawl having an engaging member for engaging a bi-directional thread of a central screw, said bi-directional thread being adapted to ensure that a single complete rotation of said vacuum rotor moves said cleaning element axially no more than the width of a vacuum rotor inlet.

17. A linkage for translating rotational movement between two elements in a cleaning filter assembly having fluid contaminants into longitudinal movement between those elements, including:
a core element within said filter assembly;
a sleeve element within said filter assembly, wherein said sleeve element and said core element are concentrically aligned and rotatable with respect to each other;
a helical groove formed on one of said core or sleeve elements; and
a pawl operatively retained in the other of said core or sleeve elements, said pawl cooperatively engaging said groove member and sliding along the path of said groove in response to said rotational movement, said sliding correspondingly causing said longitudinal movement such that the helical groove and pawl are void of contact with contaminants during the entire travel of the pawl along the helical groove between said core element and said sleeve element.

18. The linkage of claim 17, in which said core element is cylindrical, and said pawl element includes a tooth portion having a concave section corresponding to said cylindrical shape of said core element.

19. A filter cleaning apparatus including:
a housing having an inlet, a clean outlet, and a flushing outlet;
a filter element positioned to filter fluid containing contaminants flowing from the inlet to the clean outlet; and
a cleaning element positioned and configured to be actuated by opening the flushing outlet, the cleaning element includes a vacuum rotor having a rotor inlet positioned to collect debris from the filter element as the vacuum rotor moves along the filter element to vacuum debris therefrom and guide the debris for eventual dispense out the flushing outlet;
wherein the cleaning element further includes a sleeve element, and a central screw defining a helical track and a tracking guide substantially enclosed within the sleeve element such that the helical track and the tracking guide are void of any contact with fluid contaminants during the entire travel of the tracking guide along the helical track, the tracking guide cooperatively engaged with the central screw to move the vacuum rotor along the filter element in response to actuation of the cleaning element.

20. A method of filtering fluid comprising the steps of:
providing the filter cleaning apparatus of claim 19;
filtering fluid until a predetermined pressure differential is reached between fluid flowing into the housing inlet and out of the clean outlet; and
flushing debris from the filter element.

21. The method of claim 20, in which the steps of filtering and flushing occur concurrently.

22. The method of claim 20, wherein the flushing step further comprises the steps of: opening the flushing outlet to actuate the cleaning element; and closing the flushing outlet after the vacuum rotor has passed over substantially the entire surface of the filter element.

23. Apparatus to filter fluid and periodically clean a related filter element, including a housing having an inlet, a clean outlet, and a flushing outlet, a filter element positioned to filter fluid flowing from the inlet to the clean outlet, a cleaning element configured and positioned to be actuated by opening the flushing outlet, the cleaning element including at least one vacuum rotor having an inlet, the cleaning element further including a sleeve element and a central screw defining a helical track and a tracking guide substantially enclosed within the sleeve element, the tracking guide cooperatively engaged with the central screw to move the vacuum rotor along the filter element in response to activation of the cleaning element, such that the helical track and the tracking guide are void of contact with contaminants during the entire travel of the tracking guide along the helical track.

24. The apparatus of claim 21, wherein movement of the vacuum rotor inlet is rotational and longitudinal.

25. A method of filtering fluid, including:
 providing the apparatus of claim 23;
 filtering fluid until a predetermined pressure differential is reached between the incoming fluid and the outgoing fluid; and
 opening the flushing outlet to actuate the cleaning element; and closing the flushing outlet after the vacuum rotor has passed over the surface of the filter element.

26. The method of claim 25, wherein the central screw has a bi-directional thread and the bi-directional thread being adapted to ensure that a single complete rotation of the vacuum rotor moves the cleaning element axially no more than the width of the vacuum rotor inlet.

27. A linkage for translating rotational movement between two elements in a cleaning filter assembly containing fluid contaminants into longitudinal movement between those elements, including:
 a control apparatus within the filter assembly;
 a sleeve element within the control apparatus, a cetral screw and a tracking guide substantially enclosed within the sleeve element; and a helical track defined by one of the central screw or sleeve element and the tracking guide is defined by the other of said central screw or sleeve element wherein the tracking guide cooperatively engages the helical track to move a vacuum rotor along the filter element in response to activation of the control apparatus, such that the helical track and the tracking guide are void of contact with the contaminants during the entire travel of the tracking guide along the helical track.

28. The linkage of claim 27, in which the central screw is cylindrical, and the tracking member includes a tooth portion having a concave section corresponding to the cylindrical shape of the central screw.

29. The apparatus of claim 12 or claim 17 or claim 9 or claim 19, or claim 23, further including means for balancing longitudinal pressure on the cleaning element.

30. The apparatus of claim 12 or claim 17 or claim 9 or claim 19 or claim 27, including means to offset longitudinal pressure on the cleaning element.

31. The apparatus of claim 12 or claim 17 or claim 9 or claim 19 or claim 27, including means to substantially neutralize longitudinal pressure on the cleaning element.

32. The apparatus of claim 12 or claim 17 or claim 9 or claim 19 or claim 27, including a pressure equalizer sized and configured to substantially balance longitudinal pressure on the cleaning element.

* * * * *

UNITED STATES PATENT AND TRADEMARK OFFICE
CERTIFICATE OF CORRECTION

PATENT NO. : 6,959,818 B2  Page 1 of 1
APPLICATION NO. : 10/494237
DATED : November 1, 2005
INVENTOR(S) : Donald O. Olson It is certified that error appears in the above-identified patent and that said Letters Patent is hereby corrected as shown below:

In column 5, line 67, "mace" should be -- make --;

In column 11, claim 12, line 23, after "a clean outlet," insert -- and a flushing outlet, --;

In column 11, claim 17, line 62, after "longitudinal movement" insert -- such that the helical groove and pawl are void of contact with contaminants during the entire travel of the pawl along the helical groove --;

In column 13, claim 27, line 21, "cetral" should be -- central --; and

In column 14, claim 29, line 13, "23" should be -- 27 --.

Signed and Sealed this

Twenty-ninth Day of August, 2006

JON W. DUDAS
*Director of the United States Patent and Trademark Office*